US010316162B2

(12) United States Patent
Iacobucci et al.

(10) Patent No.: US 10,316,162 B2
(45) Date of Patent: Jun. 11, 2019

(54) MASTERBATCH COMPRISING A CYCLIC KETONE PEROXIDE

(71) Applicant: Akzo Nobel Chemicals International B.V., Amersfoort (NL)

(72) Inventors: Paul Albert Iacobucci, St. Charles, IL (US); Wilhelm Klaas Frijlink, Zwolle (NL); Bart Fischer, Leusden (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 331 days.

(21) Appl. No.: 14/648,801

(22) PCT Filed: Dec. 2, 2013

(86) PCT No.: PCT/EP2013/075191
§ 371 (c)(1),
(2) Date: Jun. 1, 2015

(87) PCT Pub. No.: WO2014/086692
PCT Pub. Date: Jun. 12, 2014

(65) Prior Publication Data
US 2015/0291761 A1 Oct. 15, 2015

Related U.S. Application Data

(60) Provisional application No. 61/733,556, filed on Dec. 5, 2012.

(30) Foreign Application Priority Data

Jan. 3, 2013 (EP) ..................................... 13150128

(51) Int. Cl.
*C08J 9/40* (2006.01)
*C08J 3/22* (2006.01)
*C08K 5/14* (2006.01)
*C08J 3/20* (2006.01)

(52) U.S. Cl.
CPC ................ *C08J 9/40* (2013.01); *C08J 3/203* (2013.01); *C08J 3/226* (2013.01); *C08K 5/14* (2013.01); *C08J 2201/036* (2013.01); *C08J 2323/26* (2013.01); *C08J 2467/04* (2013.01); *C08K 2201/019* (2013.01)

(58) Field of Classification Search
None
See application file for complete search history.

(56) References Cited

U.S. PATENT DOCUMENTS

| 4,225,650 A | 9/1980 | Van Brederode et al. |
| 5,516,845 A | 5/1996 | Heese et al. |
| 5,589,526 A | 12/1996 | Sienel et al. |
| 5,698,617 A * | 12/1997 | Marzola ................ C08F 255/02 523/201 |
| 5,808,110 A * | 9/1998 | Torenbeek ........... C07D 323/00 549/352 |
| 6,358,435 B1 | 3/2002 | Schuurman et al. |
| 7,429,420 B2 | 9/2008 | Wiese et al. |
| 2003/0130436 A1 | 7/2003 | Zucchelli |
| 2004/0142170 A1 | 7/2004 | Prabhu et al. |
| 2006/0128907 A1 | 6/2006 | Yu |
| 2006/0258796 A1 | 11/2006 | Boogh et al. |
| 2007/0010608 A1 | 1/2007 | Reynolds |
| 2007/0042183 A1 | 2/2007 | Stenzel et al. |
| 2007/0232757 A1 | 10/2007 | Cai et al. |
| 2012/0108758 A1 | 5/2012 | Laignel et al. |
| 2015/0329682 A1 | 11/2015 | Iacobucci et al. |

FOREIGN PATENT DOCUMENTS

| BR | 8804014 A | 4/1989 |
| CN | 101649028 A | 2/2010 |
| DE | 102 20 606 A1 | 11/2003 |
| EA | 201171300 A1 | 5/2012 |
| EP | 0 423 639 A2 | 4/1991 |
| EP | 0 459 208 A2 | 12/1991 |
| GB | 1 565 674 A | 4/1980 |
| GB | 2 441 181 A | 2/2008 |
| JP | S54-001386 A | 1/1979 |
| JP | S56-098247 A | 8/1981 |
| JP | S61-255948 A | 11/1986 |
| JP | 2003-138075 A | 5/2003 |
| JP | 2004-307538 A | 11/2004 |
| JP | 2005-105101 A | 4/2005 |
| JP | 2009-132914 A | 6/2009 |
| RU | 2 034 002 C1 | 4/1995 |
| WO | 96/03397 A1 | 2/1996 |
| WO | 98/33770 A1 | 8/1998 |
| WO | 02/46273 A2 | 6/2002 |
| WO | 03/076511 A1 | 9/2003 |
| WO | 2004/052877 A1 | 6/2004 |
| WO | 2004/055083 A1 | 7/2004 |

OTHER PUBLICATIONS

Trigonox 301 data sheet (Jun. 2016).*
Search Report of EP Application No. 13150128.0, dated Apr. 23, 2013.
International Search Report and the Written Opinion from the International Bureau of WIPO for International Application No. PCT/EP2013/075191, dated Apr. 15, 2014.
ASTM D6866-05, "Standard Test Methods for Determining the Biobased Content of Natural Range Materials Using Radiocarbon and Isotope Ratio Mass Spectrometry Analysis," ASTM International, Apr. 2005.

(Continued)

*Primary Examiner* — Robert C Boyle
(74) *Attorney, Agent, or Firm* — McDonnell Boehnen Hulbert & Berghoff LLP

(57) ABSTRACT

Masterbatch comprising a dimeric and/or trimeric cyclic ketone peroxide dispersed in a polymeric matrix with a porosity, expressed as percentage of voids on the volume of the matrix, of 0.1-80 vol %, wherein said masterbatch comprises, per 100 g of polymeric matrix, 1-30 g dimeric and/or trimeric cyclic ketone peroxide and less than 0.20 g saturated hydrocarbons with 17-51 carbon atoms.

11 Claims, No Drawings

(56) References Cited

OTHER PUBLICATIONS

ISO 15901-1, Evaluation of pore size distribution and porosimetry of solid materials by mercury porosimetry and gas adsorption—Part 1: Mercury porosimetry, Jan. 2006.
Chen, "Production control of polypropylene peroxide concentrated masterbatch," 2000, Abstract only.
Prevet, Perox PP: a range of peroxide masterbatch for PP controlled rheology, Polymers in Rheology Conference, Apr. 26-27, 2001, Abstract only.
Corneliussen, "Industry Patents," Plastics Engineering, Feb. 2009, p. 38-39.

* cited by examiner

MASTERBATCH COMPRISING A CYCLIC KETONE PEROXIDE

This application is a national stage filing under 35 U.S.C. § 371 of PCT/EP2013/075191, filed Dec. 2, 2013, which claims priority to U.S. Provisional Patent Application No. 61/733,556 filed Dec. 5, 2012, and European Patent Application No. 13150128.0, filed Jan. 3, 2013, the contents of which are each incorporated herein by reference in their entireties.

The present application relates to a masterbatch comprising dimeric and/or trimeric cyclic ketone peroxide. It also relates to a process for the preparation of this masterbatch and to the use of this masterbatch for the modification of polymers.

Masterbatches are concentrates of additives, in this case organic peroxides, which can be used in processing polymers, particularly olefin polymers. Masterbatches can be used to add organic peroxides to the polymer to be processed in order to improve the dispersion of the peroxide in said polymer and improve the ease of dosing, especially when the user is incapable of handling organic peroxides in liquid form.

Masterbatches are generally obtained by dispersing high concentrations of the peroxides in materials that are compatible with the polymer to be processed. In order to obtain the best usage economy, the concentrates should contain usable amounts up to and including the highest possible quantity of peroxide while allowing an effective dispersion of the peroxide to be reached when said masterbatches are diluted in the polymer to be processed.

Liquid cyclic ketone peroxide formulations in organic solvents are disclosed WO 98/33770 and U.S. Pat. No. 6,358,435. These liquid formulations, however, impair safety and are hazardous when stored at −0° C. or lower due to the formation of crystals which are sensitive to exploding.

A solution to this safety problem was provided by WO 2004/052877, by adding paraffin wax to the liquid formulation, which acts as a co-crystallizing compound by solidifying in said cyclic ketone peroxide formulation at a temperature above the crystallization temperature of the cyclic ketone peroxide.

It has now surprisingly been found that masterbatches of dimeric and/or trimeric cyclic ketone peroxides can be prepared in the absence of such co-crystallizing agent, without impairing on safety even at low temperatures and high peroxide concentrations. So, the addition of a co-crystallizing agent is not necessary when dispersing the cyclic ketone peroxide in a polymeric matrix.

The invention therefore relates to a masterbatch comprising dimeric and/or trimeric cyclic ketone peroxide dispersed in a polymeric matrix with a porosity, expressed as percentage of voids on the volume of the matrix, of 0.1-80 vol %, wherein said masterbatch comprises, per 100 g of polymeric matrix, 1-30 g dimeric and/or trimeric cyclic ketone peroxide and less than 0.20 g saturated hydrocarbons with 17-51 carbon atoms.

Typically, the dimeric and trimeric cyclic ketone peroxides that can be formulated in accordance with the present invention are represented by the formulae I-II:

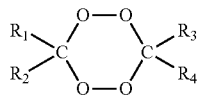
(I)

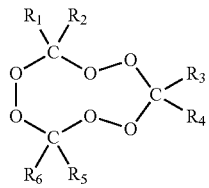
(II)

wherein $R^1$-$R^6$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; and each of $R^1$-$R^6$ may optionally be substituted with one or more groups selected from hydroxy, alkoxy, linear or branched alkyl, aryloxy, ester, carboxy, nitrile, and amido.

Most preferably, the cyclic ketone peroxide is 3,6,9-triethyl-3,6,9-trimethyl-1,4,7-triperoxonane.

Dimeric and trimeric cyclic ketone peroxides can be produced as described in WO 96/03397 and are derived from linear, branched or cyclic $C_3$-$C_{13}$, most preferably $C_3$-$C_7$ ketones. Examples of suitable ketones are acetone, acetyl acetone, methyl ethyl ketone, methyl propyl ketone, methyl isopropyl ketone, methyl butyl ketone, methyl isobutyl ketone, methyl amyl ketone, methyl isoamyl ketone, methyl hexyl ketone, methyl heptyl ketone, diethyl ketone, ethyl propyl ketone, ethyl amyl ketone, methyl octyl ketone, methyl nonyl ketone, cyclopentanone, cyclohexanone, 2-methylcyclohexanone, 3,3,5-trimethyl cyclohexanone, and mixtures thereof.

The peroxides according to formula I are referred to as dimers and those according to formula II as trimers. These dimeric and trimeric structures can be formed starting from a single ketone or from a mixture of ketones. Preferably, a single ketone is used. Typically, the masterbatch according to the invention comprises a cyclic ketone peroxide having a trimer/dimer weight ratio of from 60:40 to 99.99:0.01. Preferably, this ratio is from 80:20 to 99.95:0.05, more preferably from 85:15 to 99.9:0.1, and most preferably from 93:7 to 99.9:0.1.

The total concentration of dimeric and trimeric cyclic ketone peroxide in the polymeric matrix is 1-30 g per 100 g of polymeric matrix, more preferably 2-25 g, and most preferably 4-18 g.

At concentrations higher than 30 g, more preferably 25 g, and most preferably 18 g per 100 g of polymeric matrix, the peroxide can be squeezed out of the matrix during storage and use, leading to safety risks.

Furthermore, for the modification of polymers, such as polypropylene, small amounts of peroxide is generally used; generally below 1 phr (per hundred resin). For such applications, a masterbatch containing not more than 30 g, more preferably not more than 25 g, and most preferably not more than 18 g per 100 g of polymeric matrix is desired for accurate dosing and good incorporation in the resin.

The polymeric matrix can be made from various polymers, such as biopolymers, polyolefins, synthetic polyesters, and combinations thereof. The polymer can be a homopolymer or a copolymer.

Biopolymers are polymers that occur in or are produced by a living organism or are produced from monomers or oligomers derived from plants and/or animals. Examples of such biopolymers are polylactic acid (PLA), polyhydroxy alkanoates (PHAs) such as polyhydroxybutyrate (PHB), polyhydroxyvalerate (PHV), polyhydroxyhexanoate (PHH), polyhydroxybutyrate-co-hydroxyvalerate (PHBV), and polyhydroxybutyrate-co-hydroxyhexanoate (PHBH), and polybutylene succinates (PBSs) such as polybutylene succinate (PBS), and polybutylene succinate-co-adipate (PBSA).

Examples of polyolefins are polyethylene, polypropylene, ethylene vinyl acetate polymer and any mixtures thereof. The polyolefin can be of a polymerization reactor grade or an extruded porous grade. A preferred polyolefin is polypropylene. The term polypropylene refers to polymers comprising at least 50 mole % of polypropylene units.

The origin of these polymers can be ancient hydrocarbon (fossil) sources or renewable materials. Renewable materials are materials, for example animal or vegetable, whose stock can be reconstituted over one short period on a human scale.

It is necessary in particular that this stock can be renewed as quickly as it is consumed.

In contrast to materials resulting from fossil sources, renewable materials contain $^{14}C$.

All the carbon samples drawn from living organisms (animal or vegetable) are in fact a mixture of 3 isotopes: $^{12}C$ (accounting for approximately 98.892%), $^{13}C$ (approximately 1.108%) and $^{14}C$ (traces: $1.2 \cdot 10^{-10}$%). The ratio $^{14}C/^{12}C$ of living tissue is identical to that of the atmosphere. In a living organism, the ratio $^{14}C/^{12}C$ is maintained constant by the metabolism, because carbon is continuously exchanged with the external environment. The average ratio of $^{14}C/^{12}C$ is equal to $1.2 \cdot 10^{-12}$.

$^{12}C$ is stable, i.e. the number of atoms of $^{12}C$ in a given sample is constant over time. $^{14}C$ is radioactive and the number of atoms of $^{14}C$ in a sample decreases over time with a half-life of 5730 years. Consequently, the presence of $^{14}C$ in a material, in whatever amount, indicates that the C-atoms making up that molecule come from renewable raw materials and not from ancient hydrocarbon sources.

The $^{14}C/^{12}C$ ratio in a material can be determined by one of the methods described in standard ASTM D6866-05 (Standard Test Methods for Determining the Biobased Content of Natural Range Materials Using Radiocarbon and Isotope Ratio Mass Spectrometry Analysis, March 2005), preferably Method B described therein.

The porosity of the polymeric matrix, expressed as percentage of voids, is 0.1-80 vol %, more preferably 5-75 vol %, and most preferably 10-60 vol %. Such matrices are commercially available. If the porosity is too high, the mechanical strength of the matrix is generally low—it will have a foamy/spongy structure—and the peroxide may be easily sqeezed out of the pores by the slightest pressure, e.g. during handling or storage.

This porosity is determined through mercury absorption according to ISO 15901-1 (2005).

The masterbatch comprises less than 0.20 g of saturated hydrocarbons with 17-51 carbon atoms per 100 g of polymeric matrix, preferably less than 0.15 g, and most preferably less than 0.10 g. In other words: the masterbatch contains no or only a minor amount of paraffin wax, i.e. paraffins that are solid at room temperature. Despite this (near) absence of paraffin wax, the masterbatch is safe and stable and can be stored at temperatures below 0° C. without the formation of a dangerous crystal phase of cyclic ketone peroxide.

The amount of said saturated hydrocarbons in the masterbatch can be deteremined by extracting the masterbatch with heptane and analyzing the extract with gas chromatography.

The masterbatch according to the present invention can be prepared by impregnation of the polymeric matrix with a dimeric and/or trimeric cyclic ketone peroxide-containing formulation. This formulation preferably contains the dimeric and/or or trimeric cyclic ketone peroxide in a total concentration of 10-60 wt %, more preferably 20-55 wt %, and most preferably 30-50 wt %.

The formulation further contains a solvent. Suitable solvents include linear and branched hydrocarbon solvents, such as isododecane, tetradecane, tridecane, Isopar® M, Exxsol® D80, Exxsol® D100, Exxsol® D100S, Soltrol® 145, Soltrol® 170, Varsol® 80, Varsol® 110, Shellsol® D100, Shellsol® D70, Halpasol® i 235/265, and mixtures thereof. Particularly preferred phlegmatizers are Isopar® M and Soltrol® 170.

Preferably, the solvent has a 95% boil-off point in the range of 200-260° C., more preferably 225-255° C., most preferably 235-250° C. The 95% boil-off point is the boiling point (bp) at which 95% by weight of the solvent is boiled off, or in the case of a single solvent compound, such as tetradecane, the boiling point of this compound. Typically the 95% boil-off point is obtained from conventional analytical methods like ASTM-D5399.

Impregnation can be done by contacting the dimeric and/or trimeric cyclic ketone peroxide-containing formulation with the polymeric matrix.

In order to reduce the risk of dust explosions, the impregnation is preferably carried out under inert (e.g. nitrogen) atmosphere. The peroxide (formulation) is preferably slowly added to the polymeric matrix. After addition of the peroxide (formulation) to the matrix, the resulting mixture is preferably mixed for, e.g., 10-120 minutes, more preferably 20-90 minutes. Solvent may be removed by evaporation, if so desired. After the impregnation, and either before or after solvent removal, the resulting masterbatch may be aged. This aging can be performed at any temperature below the SADT (self-accelerating decomposition temperature) of the peroxide and at any time in the range 2 hours to several days.

The polymeric matrix may be impregnated with only one dimeric or trimeric cyclic ketone peroxide, but may also be impregnated with two or more dimeric and/or trimeric cyclic ketone peroxides. Alternatively, the polymeric matrix may be impregnated with one or more dimeric and/or trimeric cyclic organic peroxides and one or more additional peroxides or hydroperoxides. These additional (hydro)peroxides may be included in the formulation containing the dimeric and/or or trimeric cyclic ketone peroxide but may alternatively be impregnated in a separate step.

Examples of suitable additional peroxides and/or hydroperoxides include di(tert-butyl)peroxide, di(tert-amyl)peroxide, 2,5-dimethyl-2,5-di(tert-butylperoxy)hexane, 3,3,5,7,7-pentamethyl-1,2,4-trioxepane, tert-butylperoxy 2-ethylhexyl carbonate, and 1,1,3,3-tetramethylbutyl hydroperoxide.

The masterbatch according to the present invention may optionally contain certain additives as long as these additives do not have a significant negative effect on the safety, transportability and/or storage stability of the formulation. As examples of such additives may be mentioned: antiozonants, antioxidants, antidegradants, U.V. stabilizers, coagents, fungicides, antistatic agents, pigments, dyes, coupling agents, dispersing aids, blowing agents, lubricants, process oils, and mould-release agents. These additives may be employed in their usual amounts.

The present invention also relates to the use of such masterbatches in polymer modification processes such as controlled rheology polypropylene processing (i.e. polypropylene degradation).

EXAMPLES

Example 1

A formulation of 24 wt % cyclic trimeric methyl ethyl ketone (MEK) peroxide in pentane was absorbed on polypropylene with a porosity of 36 vol %, by slowly adding the formulation to said polypropylene while stirring.

After stirring for 25 minutes, the high volatile pentane was stripped off the formulation by passing air through the sample, followed by evacuation of the sample to around 10 mbar at room temperature. This resulted in a masterbatch comprising 7 wt % trimeric MEK peroxide on polypropylene.

A masterbatch comprising 13.3 wt % trimeric MEK peroxide was obtained by repeating the above procedure.

The porosity of the polypropylene was determined by mercury intrusion according to ISO 15901-1: *Evaluation of pore size distribution and porosimetry of solid materials by mercury porosimetry and gas adsorption—Part 1: Mercury porosimetry*. The instrument used was a Micromeritics Autopore 9505 Porosimeter in the pressure range from vacuum up to 220 MPa. Prior to the measurement, the polypropylene was dried by vacuum at 35° C. for 6 hours.

The crystallization behavior of the peroxide in the masterbatches—freshly prepared and after storage at −25° C. for several weeks—were analyzed with differential scanning calorimetry (DSC). A cup containing the masterbatch was placed on dry ice, −80° C., and transferred into a pre-cooled DSC oven at −25° C. The transfer was carried out as fast as possible to avoid heating, and thus melting, of the possibly solidified peroxide. The first period of 10-20 minutes at −25° C. in the DSC oven was to evaporate the ice on the outside of the DSC pan. The samples were then heated to +35° C., with a heating rate of 2° C./min.

No crystallization of peroxide was observed with this test in both masterbatches, not even after 5 weeks of storage at −25° C.

The masterbatches were also subjected to the Modified Trauzl test according to the UN Recommendations on the Transport of Dangerous Goods. A standardized amount of sample was weighed into a glass vial and placed in a lead block. The lead block is provided with a standardized bore hole. A blast cap with 0.6 gram of a high explosive, PETN, was placed in the centre of the sample. The tests were carried out in a concrete cell, all remote controlled.

The expansion of the lead block, after subtracting the expansion of an inert substance, is a measure for the explosive power of the sample. Tests were carried out using 4.5 gram sample.

The Modified Trauzl test was selected to discriminate between crystallized and dissolved cyclic trimeric MEK-peroxide because the crystallized peroxide shows detonative properties and this will give a high expansion of the lead block.

The explosive power as measured with this test was equal to the explosive power of a commercial sample of trimeric cyclic MEK peroxide in Isopar M containing paraffin wax (Trigonox® 301).

This Example shows that wax-free masterbatches of cyclic trimeric methyl ethyl ketone peroxide according to the present invention exhibit safe characteristics. These characteristics are similar to commercially available wax-containing cyclic trimeric methyl ethyl ketone peroxide solutions.

Example 2

Peroxide masterbatches were prepared by formulating cyclic trimeric MEK-peroxide solutions in Isopar M on the polypropylene used in Example 1. The final contents of cyclic trimeric MEK-peroxide (as pure peroxide) were 10 and 12 wt %. Caking cylinders (stainless steel, 4 cm internal diameter and 19 cm height) were filled with the different masterbatch materials (about 30 g). With a plunger a load of 0.23 kg was applied on top of each to simulate the pressure conditions as if 25 kg product would be packed in a bag in a cardboard box, or 4 bags stacked on top of one another on a pallet.

The caking cylinders were stored in a circulation oven for 4 weeks at 35° C. After this period the loads were removed and the caking cylinders were opened carefully to release the materials in order to visually inspect if caking had occurred. In all tests no caking was observed, the materials were still free flowing.

The invention claimed is:

1. A masterbatch comprising 3,6,9-triethyl-3,6,9-trimethyl-1,4,7-triperoxonane dispersed in a polymeric matrix with a porosity, expressed as percentage of voids on the volume of the matrix, of 0.1-80 vol %, wherein said masterbatch comprises, per 100 g of polymeric matrix, 1-30 g 3,6,9-triethyl-3,6,9-trimethyl-1,4,7-triperoxonane and less than 0.20 g saturated hydrocarbons with 17-51 carbon atoms.

2. The masterbatch according to claim 1, comprising, per 100 g of a polymeric matrix, less than 0.15 g saturated hydrocarbons with 17-51 carbon atoms.

3. The masterbatch according to claim 2, comprising, per 100 g of a polymeric matrix, less than 0.10 g saturated hydrocarbons with 17-51 carbon atoms.

4. The masterbatch according to claim 1, wherein the resulting masterbatch comprises 4-18 g of 3,6,9-triethyl-3,6,9-trimethyl-1,4,7-triperoxonane per 100 g of polymeric matrix.

5. The masterbatch according to claim 1, wherein the polymeric matrix has a porosity of 10-60 vol %.

6. The masterbatch according to claim 1, wherein the polymeric matrix consists for at least 50 wt % of polypropylene, polyethylene, ethylene vinyl acetate polymer or any mixtures thereof.

7. The masterbatch according to claim 6, wherein the polymer is a polymerization reactor grade or extruded porous grade.

8. A process for the preparation of a masterbatch according to claim 1, comprising
   (i) providing a polymeric matrix with a porosity, expressed as percentage of voids on the volume of the matrix, of 0.1-80 vol % and
   (ii) impregnating said polymeric matrix with a formulation comprising 3,6,9-triethyl-3,6,9-trimethyl-1,4,7-triperoxonane and one or more solvents.

9. A method for the modification of a polymer, comprising adding the masterbatch according to claim 1 to a polymer.

10. The method according to claim 9, wherein the modification involves cracking of polypropylene homopolymers and/or copolymers of propylene and ethylene.

11. The method according to claim 9, wherein the modification involves the introduction of long chain branches or crosslinking of polyethylenes.

* * * * *